J. SPEED.
TRAP.
APPLICATION FILED DEC. 29, 1916.
1,232,403.
Patented July 3, 1917.
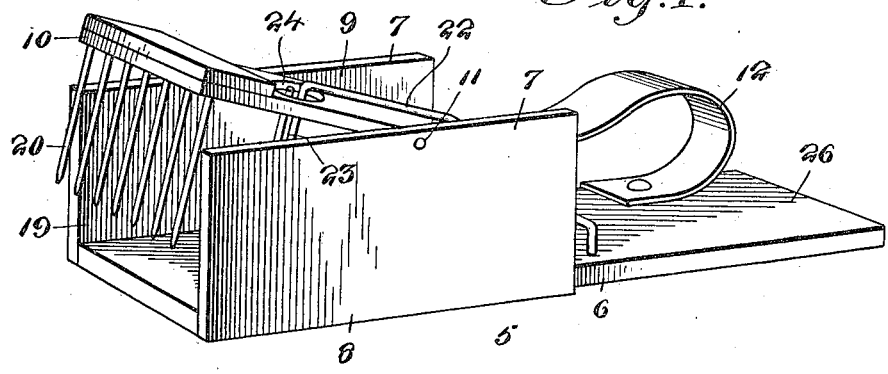
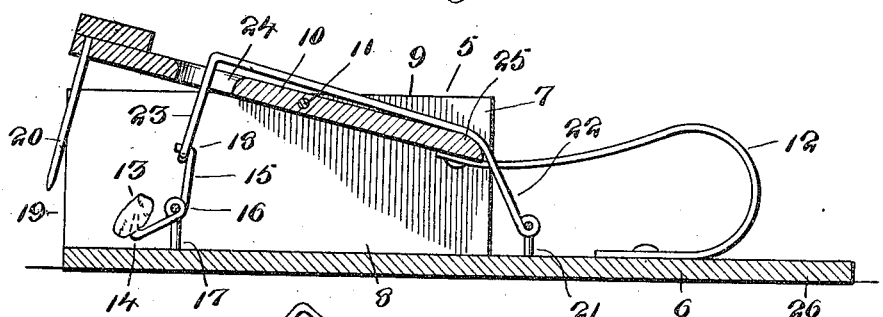
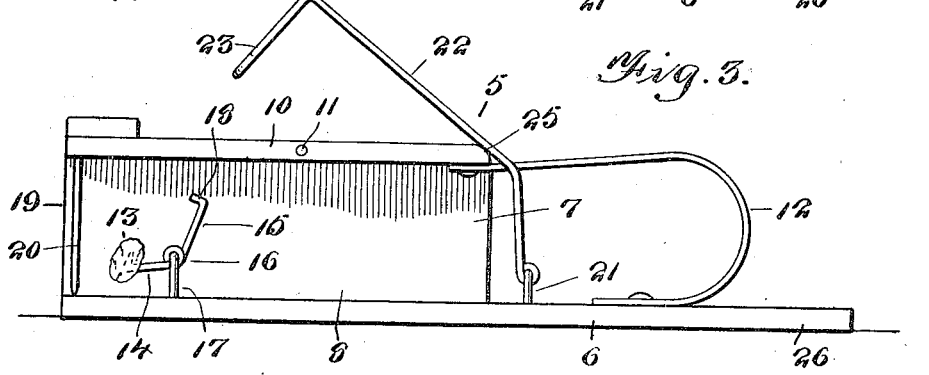
Inventor
Jefferson Speed
Witnesses
E. R. Ruppert
J. Harry King
By Victor J. Evans
Attorney

UNITED STATES PATENT OFFICE.

JEFFERSON SPEED, OF TATUM, TEXAS.

TRAP.

1,232,403.  Specification of Letters Patent.  Patented July 3, 1917.

Application filed December 29, 1916. Serial No. 139,570.

*To all whom it may concern:*

Be it known that I, JEFFERSON SPEED, a citizen of the United States, residing at Tatum, in the county of Rusk and State of Texas, have invented new and useful Improvements in Traps, of which the following is a specification.

The present invention relates to traps, and more particularly to that class thereunder known as impalement traps.

An object of the invention resides in the production of a novel form of trap whereby means are employed for holding the trap in a set position to readily entrap the animal therein upon the latter tampering with the bait of the trap.

Furthermore, it is the purpose of this invention to produce a trap which may be manufactured and sold at a comparatively low cost and one primarily adapted to be used for catching mice.

With the above and other objects in view, the invention consists in the novel features, details of construction and combination of parts which will hereinafter be more fully set forth, illustrated in the accompanying drawing and pointed out in the appended claims.

Figure 1 is a perspective view of the trap shown in set position;

Fig. 2 is a longitudinal sectional view; and

Fig. 3 is a side elevation of the trap illustrating one of the walls of the casing removed and showing the trap in closed position.

Referring more particularly to the accompanying drawing, in which like characters of reference refer to corresponding parts in the several views, the trap generally is denoted by the character 5 and primarily employed for catching mice, but it is to be understood that I do not limit myself to the specific use of the trap, as the same may be utilized for catching other animals, rats or the like.

In carrying out the present invention, the trap 5 denotes a substantially rectangular base having secured to the opposite longitudinal side edges a pair of spaced parallel side walls 7 of a lesser length than the base to provide on the forward end of the base a casing 8. The manner of connection of the walls with the base provides the same with a longitudinal open upper end 9 in which is pivotally mounted an entrapping member 10. This member 10 is in the form of a rectangular blade of a length equaling the length of the casing and pivotally connected as at 11 at the intermediate portion of the casing adjacent the upper edges of the side walls 7 to adapt the entrapping member for a vertical swinging movement. The manner of connecting the member 10 with said casing utilizes the member 10 as a closure therefor. A strong leaf spring 12 is fastened at one end to the base 6 at a point in rear of the casing 8, while the opposite end of said spring is fastened to the underneath surface of the entrapping member 10, thereby tensioning such member to automatically throw the said member to a closed position for killing the animal tampering with the bait 13 fastened on the lower hook 14 of the trigger 15. The said trigger 15 is constructed of a single strand of wire bent at its intermediate portion to provide a circular opening 16 which embraces the horizontal connecting portion of the U-shaped bearing 17. The manner of forming the trigger 15 provides the same with a latch 18. The entrance opening 19 of the casing, when the trap is sprung to a closed position, is closed through the employment of spaced vertically arranged prongs 20 secured to and depending from the under surface of the entrapping member 10 at the extreme forward end thereof. Fastened to the base 6 at a point adjacent to the rear end of the casing is a staple 21 to which is pivotally connected a keeper 22. The keeper 22 is preferably constructed of a single strand of resilient material bent at its forward end to provide a depending loop 23 which upon the tensioning of the entrapping member 10 will allow of the loop to protrude through a circular opening 24. In order to prevent any frictional contact of the keeper 22 with the entrapping member 10, I provide on the rear transverse edge of the entrapping member 10 a downwardly beveled portion 25, whereas to obviate the same difficulty with the loop 23, the wall of the opening 24 is beveled in an upward and outward direction.

In briefly describing the operation of the invention, it is to be stated that in setting the trap, the operator by pressing downwardly on the rear end of the trapping member will tension the spring 12 and throw the prong members 20 in an elevated position, the loop 23 of the keeper 22 is thence inserted within the opening 24 and engaged with the latch 18 of the trigger, consequently when the animal grabs the bait, it will tilt the latch 18 and release the same from the loop 23 and through the influence of the spring 12, the animal will be entrapped by the penetration of the prongs 20 through the animal. The rear portion 26 of the platform may be utilized as a handle for conveying the trap from place to place.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claims.

What is claimed as new, is:—

1. A trap of the character set forth embodying a base, a casing secured at one end of the base, an entrapping member pivotally secured in the upper end of the casing, a leaf spring connected at one end to the base at a point in rear of the casing and at its opposite end to the underneath surface of the entrapping member, a trigger in said casing, and a keeper pivotally connected to the platform and extending through an opening in the entrapping member and interlocking with said trigger for holding the entrapping member against the tension of the spring.

2. A trap of the character set forth comprising a base, side walls connected to the opposite longitudinal edges of said base and terminating short of one end of said base to provide the base with a casing, an entrapping member pivotally mounted in the side walls of the casing and serving to close the upper end of said casing, means for tensioning the said entrapping member, a trigger pivotally secured in said casing, a keeper pivotally secured to the base at a point in rear of said casing and provided with a depending loop, said keeper extending over the entrapping member for a portion of its length and disposing the loop thereof through an opening formed in said entrapping member, said loop adapted to engage with the trigger for holding the entrapping member against the tension of said spring.

In testimony whereof I affix my signature.

JEFFERSON SPEED.